Jan. 9, 1968  G. P. McGRAW, JR  3,362,442
DISPENSING APPARATUS
Filed March 8, 1965  5 Sheets-Sheet 2
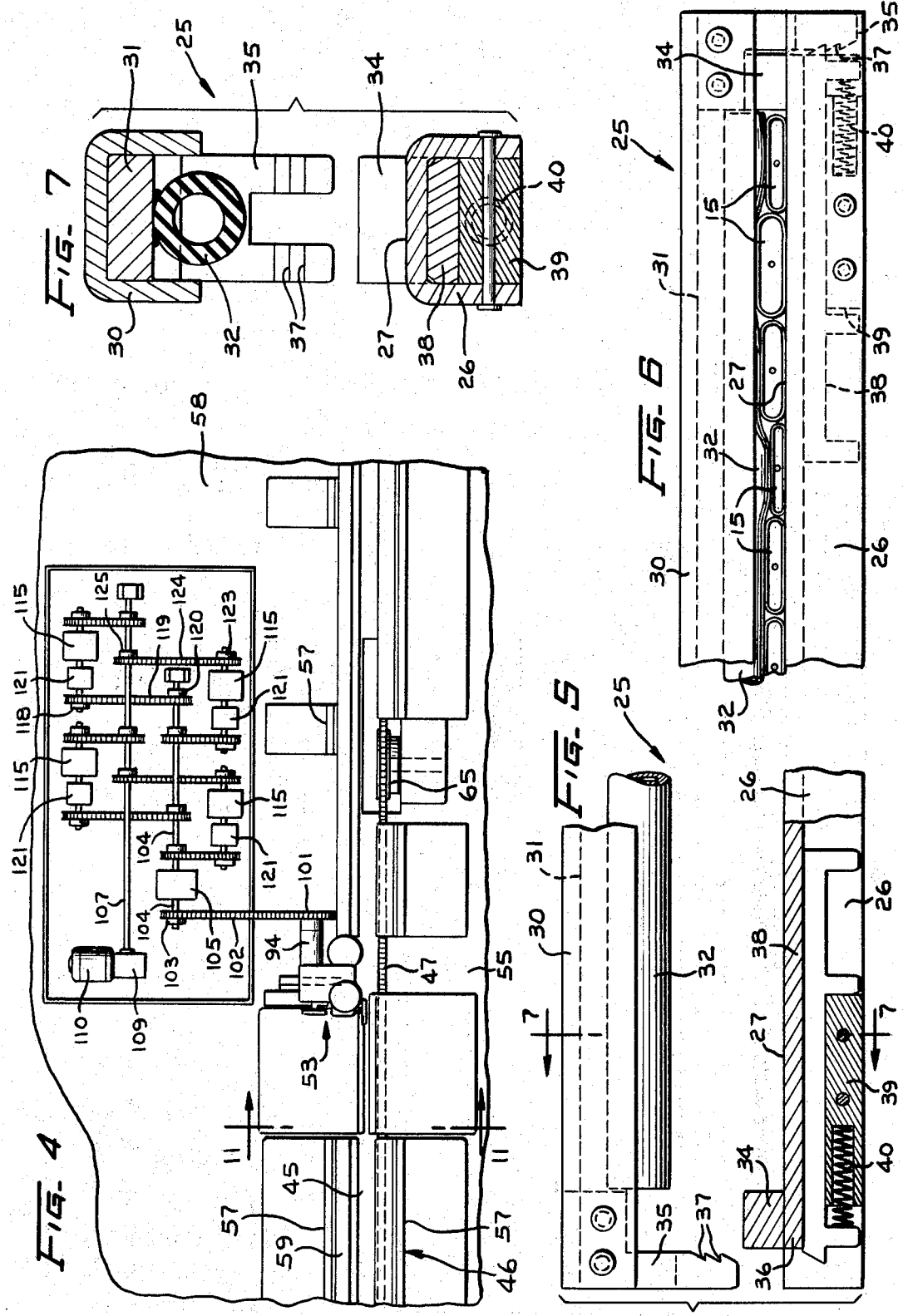

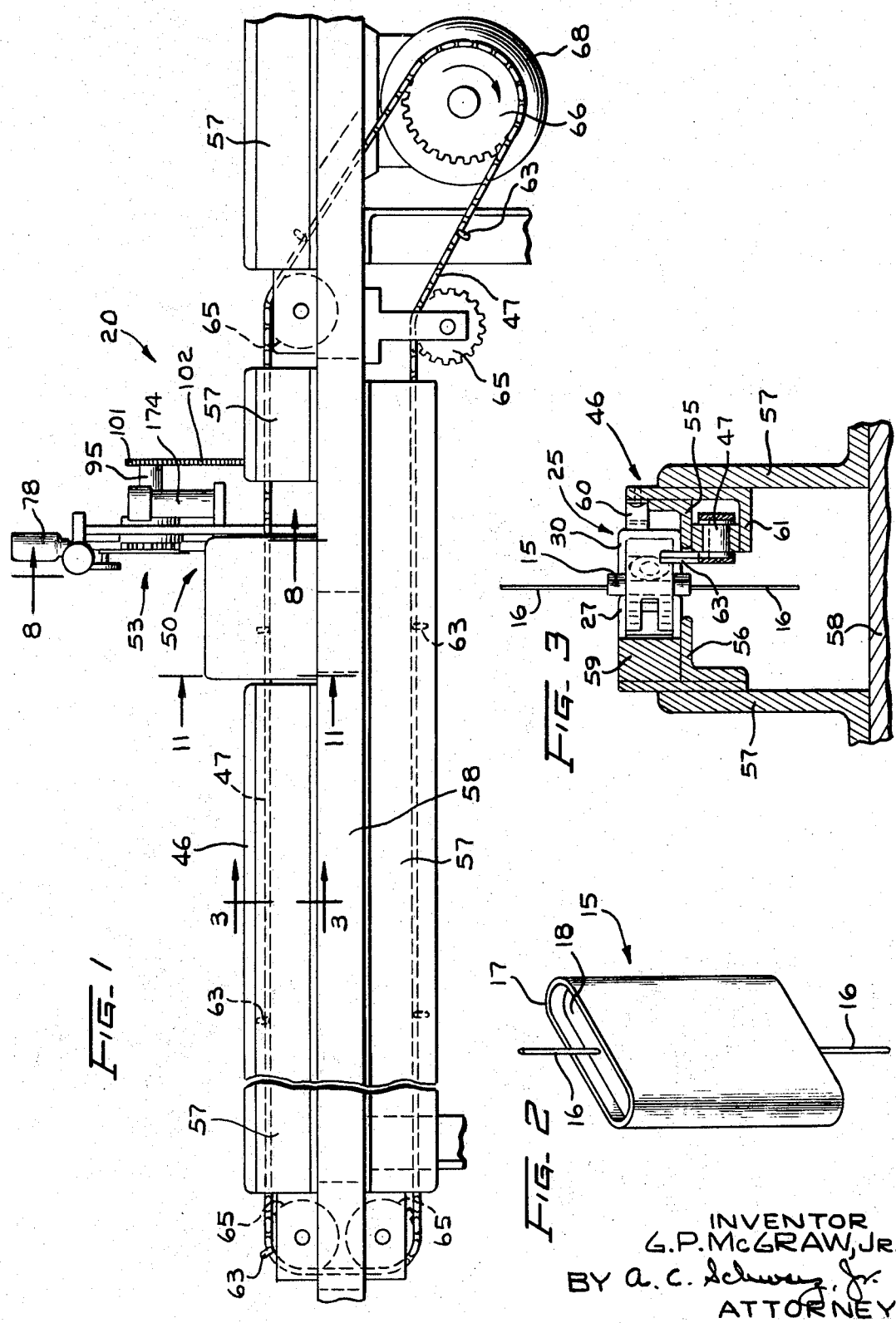

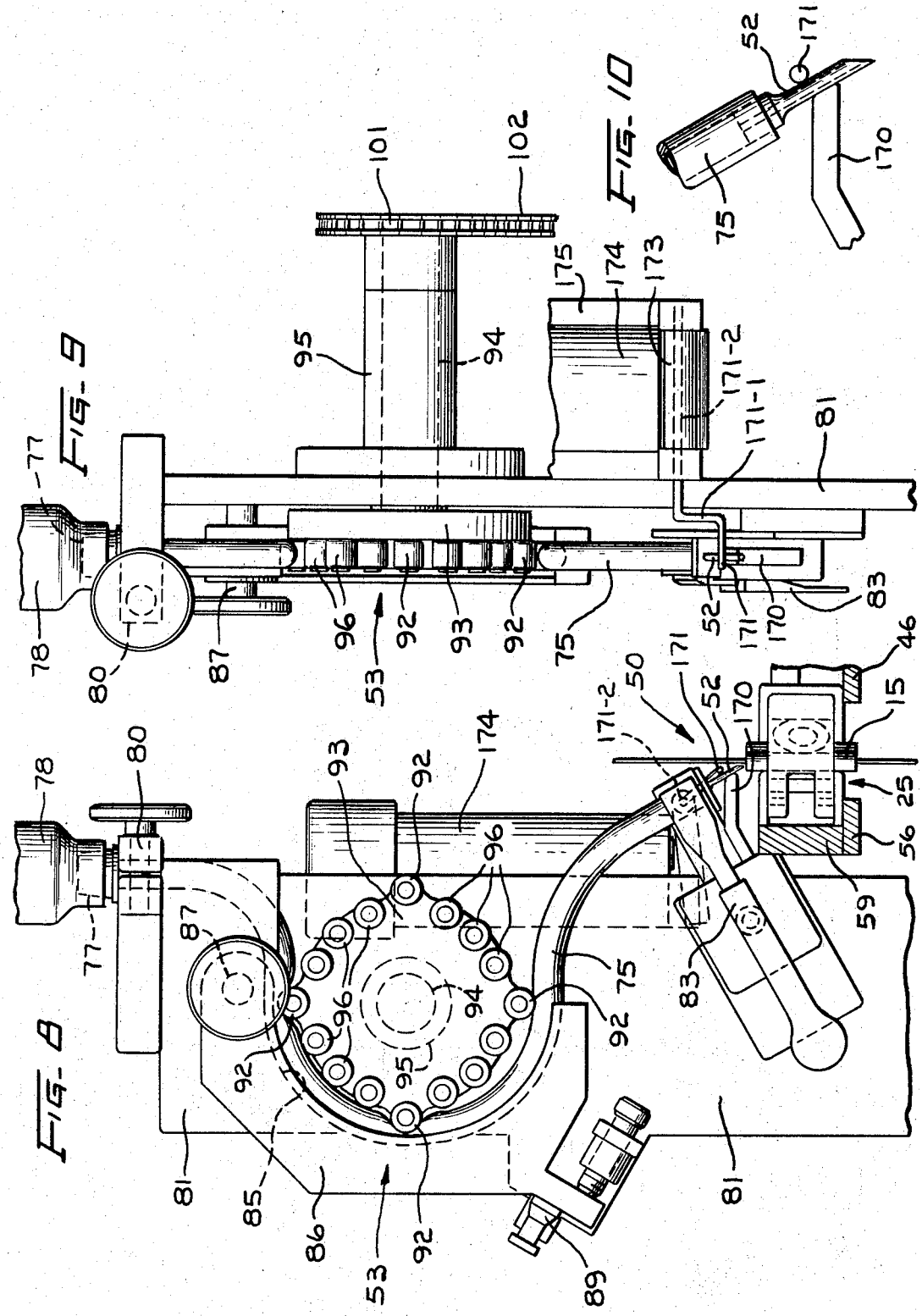

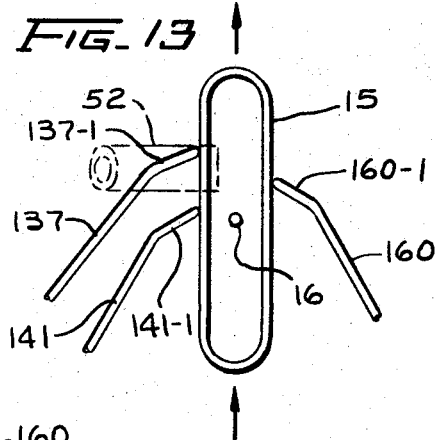
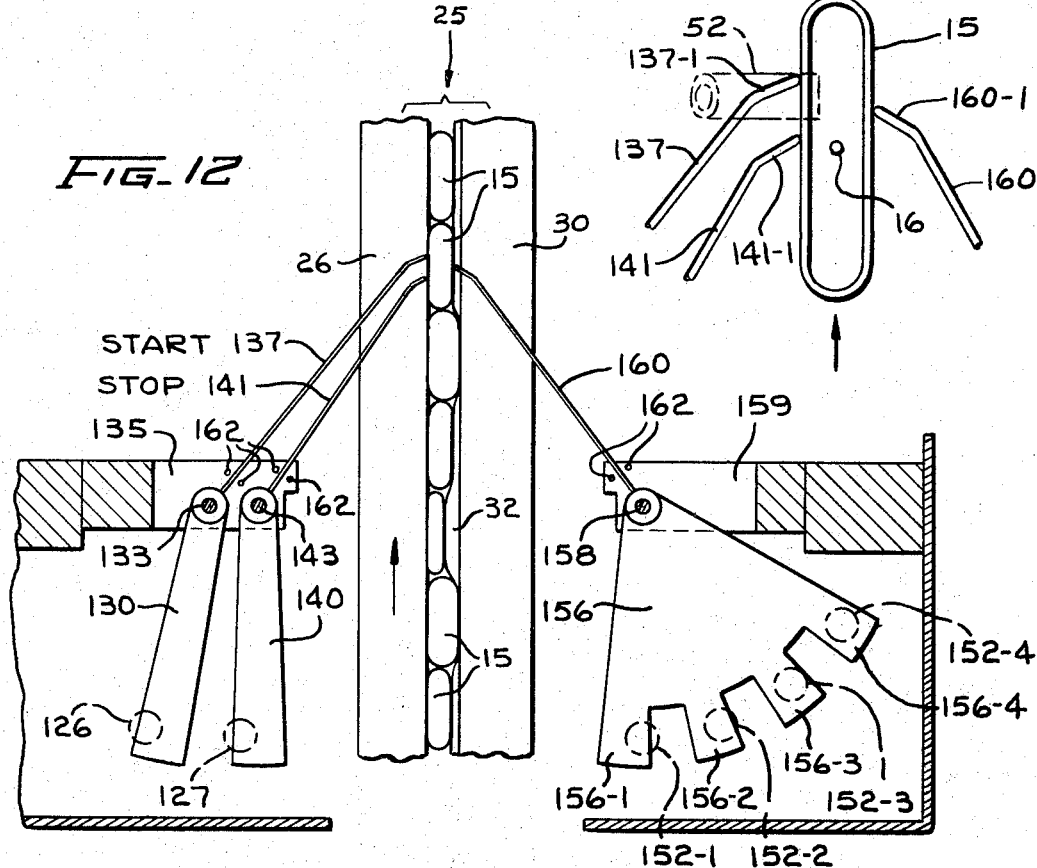
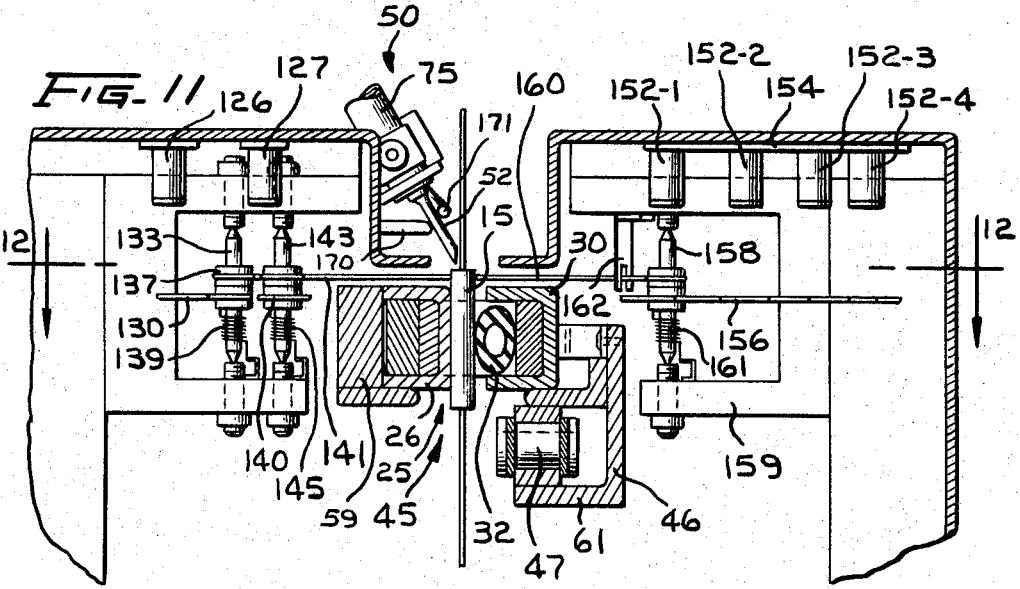

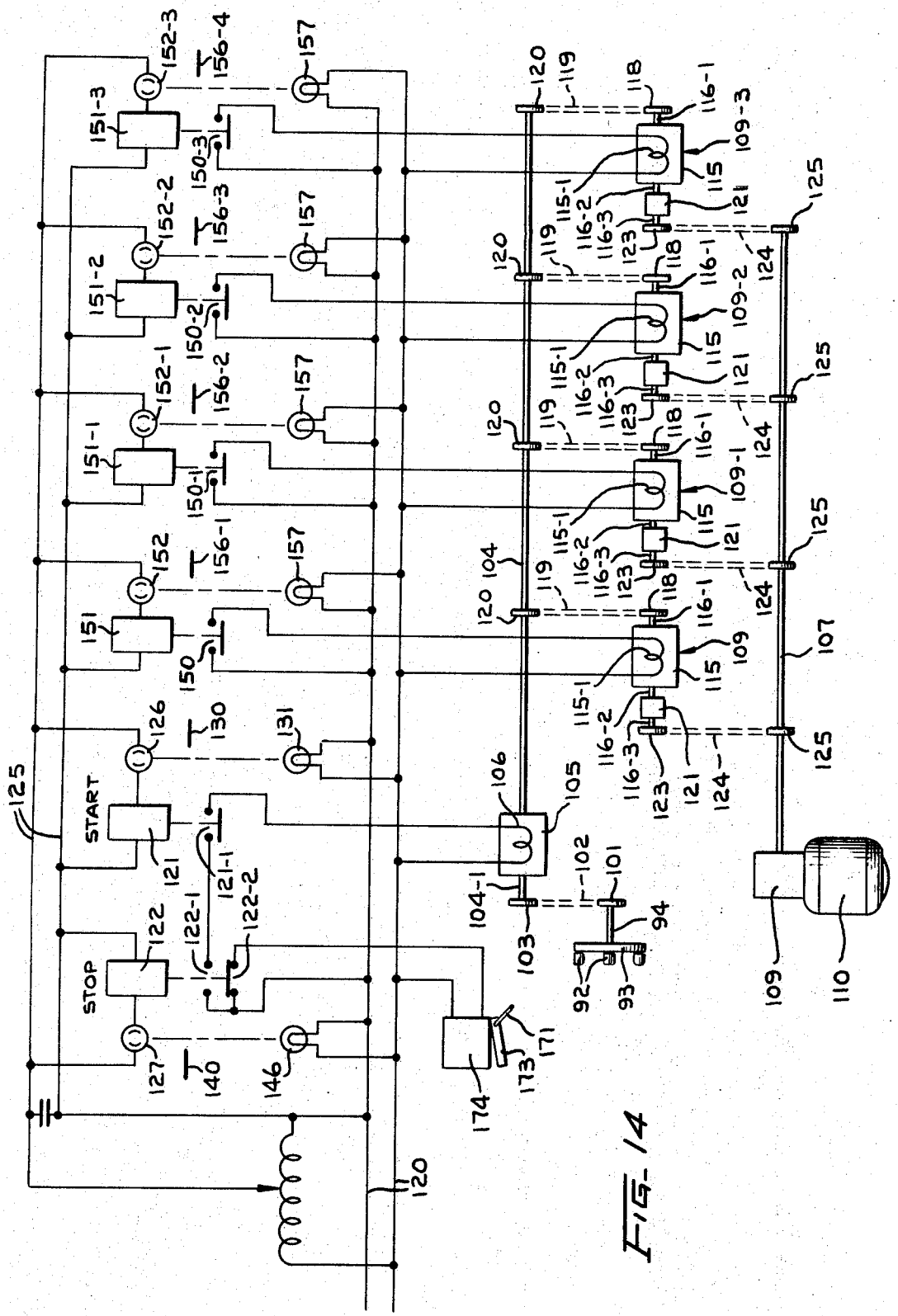

United States Patent Office 3,362,442
Patented Jan. 9, 1968

3,362,442
DISPENSING APPARATUS
George P. McGraw, Jr., Downers Grove, Ill., assignor to Western Electric Company, Incorporated, New York, N.Y., a corporation of New York
Filed Mar. 8, 1965, Ser. No. 437,713
12 Claims. (Cl. 141—141)

ABSTRACT OF THE DISCLOSURE

A dispensing apparatus wherein a row of capacitors of different sizes is advanced below a feed nozzle through which fluid resin is fed from a supply thereof into the recessed ends of the capacitors by a pump driven by a variable speed, disconnectible, drive at various rates in accordance with variations in thickness of the capacitors. Feelers engageable with one side of the moving capacitors control the connection and disconnection of the drive to the pump, and another feeler, responsive to variations in the thickness of the capacitors, controls the speed of the drive and the rate of feed of the resin.

---

The present invention relates to dispensing apparatus, and more particularly to an apparatus for dispensing various amounts of fluid material to recessed articles in accordance with the size of the articles and the recesses therein.

Among the various methods of hermetically sealing wound capacitors is one in which a flat type capacitor has several turns of a dielectric adhesive tape wound around it to form an impervious protective layer therearound. The dielectric tape is wider than the length of the capacitor and extends beyond the ends thereof to form recesses at opposite ends of the capacitor. These recesses which vary in size in accordance with the cross-sectional area of the capacitors are filled with a compound such as epoxy resin which subsequently hardens to seal the ends of the capacitor. The volume of compound necessary to fill a cavity at the end of the capacitor varies with the size of the capacitor.

An object of the invention is to provide an improved dispensing apparatus.

A further object of the invention is to provide an apparatus for dispensing various amounts of fluid material to recessed articles in accordance with the size of the articles and the recesses therein.

An apparatus illustrating certain features of the invention may include mechanism for advancing a row of recessed flat-type capacitors of different thicknesses along a predetermined path through a dispensing station, a resilient tube connected to a supply of fluid sealing material and having an outlet nozzle disposed at the dispensing station above and adjacent to the path of movement of the capacitors, and a rotor having spaced rollers engageable successively with the resilient tube for compressing successive portions thereof through a predetermined zone to effect the dispensing of the sealing compound therefrom. The rotor is connectible to a variable speed drive mechanism through an electric clutch and is actuated under control of mechanism including first and second feeler members disposed at the dispensing station in the path of movement of the capacitors and engageable with one side of the capacitors and actuated thereby to effect the starting and stopping, respectively, of the rotor in response to movement of the feeler member occurring during the engagement of the first feeler member with the capacitor and the disengagement of the second feeler member from the capacitor.

The control mechanism also includes a feeler member engageable with the opposite side of the capacitors at the dispensing station for varying the rate of rotation of the rotor and the dispensing of the sealing compound in accordance with the thickness of the capacitor at the dispensing station. Mechanism is also provided for compressing the nozzle in response to the stopping of rotation of the rotor to prevent the dripping of compound therefrom.

Other objects, advantages and novel aspects of the invention will become apparent upon consideration of the following detailed description, in conjunction with the accompanying drawings, in which:

FIG. 1 is a fragmentary side view of the dispensing apparatus embodying the present invention;

FIG. 2 is an enlarged perspective view of a capacitor having recessed ends which are to be filled with a sealing compound in the present apparatus;

FIG. 3 is an enlarged fragmentary cross-sectional view of the apparatus taken on the line 3—3 of FIG. 1;

FIG. 4 is a fragmentary plan view of the dispensing apparatus;

FIG. 5 is a fragmentary sectional elevational view of a composite fixture for holding a row of the capacitors and showing the components of the fixture in separated relation to one another;

FIG. 6 is a fragmentary elevational sectional view of the capacitor holding fixture showing the components of the fixture in closed position with a row of capacitors supported thereby;

FIG. 7 is a cross-sectional enlarged view of the fixture taken on the line 7—7 of FIG. 5 with the fixture components in separated relation to one another;

FIG. 8 is a fragmentary vertical cross-sectional view at the dispensing station of the apparatus taken on the line 8—8 of FIG. 1 and showing the pumping mechanism;

FIG. 9 is a fragmentary front elevational view of the pumping mechanism;

FIG. 10 is an enlarged fragmentary sectional view of the dispensing nozzle of the apparatus;

FIG. 11 is an enlarged vertical cross-sectional view of the apparatus taken on the line 11—11 of FIGS. 1 and 4 and showing a portion of the control mechanism of the apparatus;

FIG. 12 is a fragmentary plan sectional view of the control mechanism shown in FIG. 11;

FIG. 13 is an enlarged fragmentary view of a portion of the control mechanism; and FIG. 14 is a diagrammatic view of the electrical control mechanism of the apparatus.

The recessed articles to be filled with sealing compound in the present apparatus are in the form of flat-type wound capacitors 15 (FIG. 2) having wire terminals 16 extending from opposite ends thereof and having a dielectric adhesive tape 17 wrapped therearound and extending beyond the ends of the capacitor to form recesses 18 at opposite ends thereof for receiving the sealing compound. The present apparatus 20 is capable of filling the recessed end of a capacitor with plastic sealing compound such as epoxy resin to seal the ends of the capacitor, and to vary the amount of epoxy resin supplied to the recess in accordance with the size of the capacitor and the recess therein.

A plurality of recessed capacitors 15 of uniform length and of various sizes in width and thickness are adapted to be supported in a row in a holding fixture 25 (FIGS. 5–7). The fixture comprises a supporting bar 26 of U-shape in cross section and having a flat surface 27 on which the capacitors 15 are arranged in side-by-side abutting or spaced relation to one another. A clamping bar 30 of U-shaped cross section having a spacer bar 31 and a resilient tube 32 extending along substantially the entire length thereof, is provided for clamping the row of recessed capacitors 15 against the supporting bar 26. A pair of spacer blocks 34 on the supporting bar 36 limits the relative movement between the bars 27 and 30 to closed position. Secured to and extending laterally from opposite ends of the clamping bar 30 are locking fingers 35 which fit into slots 36 in the supporting bar 26 and are provided with ratchet teeth 37. A pair of manually releasable locking plungers 38 are slidably supported on blocks 39 on the supporting bar 26 and are urged by springs 40 into engagement with the teeth 37 on the fingers 35 to secure the clamping bar 30 in closed position.

The capacitors 15 which are of uniform length and which may vary in width and in thickness are placed side by side in a row on the supporting bar in horizontal position and are clamped thereagainst individually by the resilient tube 32 and the clamping bar 30 with one side of the capacitors disposed in the plane of the flat surface 27 of the supporting bar 26 and with the opposite sides of the capacitors 15 spaced various distances from the supporting surface 27 in accordance with the thickness of the capacitors. The ends of the capacitors 15 project beyond the fixture 25 and are accessible for filling when directed upwardly.

Successive holding fixtures 25 with the capacitors 15 clamped therein are placed in a horizontal trackway 45 of a composite track 46 (FIGS. 3 and 4) of the apparatus with the capacitors 15 disposed vertically. The fixtures are advanced by a continuously operating conveyor chain 47 to move successive capacitors into a dispensing or filling station 50 (FIGS. 1, 2 and 8) and beneath a nozzle 52 of a pumping mechanism 53 for dispensing the sealing compound. In the trackway 45 the capacitor holding fixture 25 rests on horizontal flanges of a pair of angle bars 55, 56 (FIG. 3) that are secured to the vertically disposed flanges of a pair of angle brackets 57 of the track 46 which in turn are mounted on a horizontal frame plate 58. The holding fixture 25 is urged against a guide rail 59 of the composite track 46 by leaf springs 60 on the vertical flange of an angle bar 61 of the track 46.

The horizontal flanges of the angle bars 55 and 61 cooperate to form a trackway for guiding the upper flight of the conveyor chain 47. Lugs 63 (FIGS. 1 and 3) extending upwardly from the conveyor chain at intervals engage the ends of the fixtures 25 and impart movement thereto. The endless conveyor chain 47 is supported in part by idler sprockets 65 and a drive sprocket 66, and is driven from a suitable drive motor 68 secured to the underside of the horizontal frame plate 55.

The pumping mechanism 53 (FIGS. 1, 8 and 9) includes a resilient plastic pump tube 75 to the lower end of which is attached the nozzle 52 that has a restricted orifice for dispensing the sealing resin in drops. The resilient tube 75 extends upwardly from the nozzle 52 through a curved path and is connected at its upper end to an enlarged apertured plug 77 which is adapted to fit in and close the neck of a container 78 for holding a supply of the resin. The upper end of the pump tube 75 and the plug 77 are releasably supported in a quick-acting clamp 80 which is mounted on the upper end of a vertical frame plate 81 extending upwardly from the horizontal frame plate 58 at the dispensing station 50. The lower end of the pump tube 75 is likewise releasably secured by a quick-acting clamp 83 mounted on the vertical frame plate 81.

The intermediate portion of the pump tube 75 bears against a substantially semicircular concave surface 85 of a backup member 86 which is supported at its upper end for pivotal movement about a pin 87 on the vertical frame plate 81 and which is releasably held in a fixed position by a quick-acting clamp 89 on the vertical frame plate 81.

A portion of the pump tube 75 is adapted to be compressed progressively against the curved backup member 86 along a predetermined zone by successive ones of four compression rollers 92 of a pump rotor 93. The rotor 93 is secured to a shaft 94 which is journalled in a bearing 95 on the vertical frame plate 81. The four compression rollers 92 are secured to the rotor 93 in equiangularly spaced relation to each other about the axis of the rotor, and a plurality of auxiliary rollers 96 are supported on the pump rotor 93 intermediate the compression rollers 92 and are arranged in a circle closer to the axis of the rotor for supporting portions of the pump tube 75 in an uncompressed and arcuate condition between the compression rollers 92.

The curvature on the backup member is such that as the pump rotor 93 is rotated in a counterclockwise direction as viewed in FIG. 8, a compression roller 92 is brought into engagement with the resilient pump tube at a point at about 12 o'clock on the circle and serves to compress successive portions of the pump tube 75 against the backup surface through an angular distance of approximately 90° of rotation of the pump rotor beyond which the backup surface provides clearance so as to effect the gradual decompression of the pump tube during the next 90° of rotation of the rotor.

It will be understood that as the compression roller 92 compresses successive portions of the flexible tube against the backup surface it serves to force the plastic resin along the tube 75 and causes the resin to be dispensed in drops at the end of the nozzle 52 into the recess 18 of the upper end of a capacitor 15 advancing thereunderneath.

After the apparatus has been in use for a predetermined length of time, the epoxy resin begins hardening in the tube 75, at which time the clamp 89 is released and the backup member 86 is pivoted to an open position, after which the clamps 80 and 83 are opened. The supply receptacle 78 with the attached pump tube and nozzle 52 are then removed from the apparatus and replaced with a receptacle 78 containing a fresh supply of resin and a new pump tube 75 and nozzle 52 attached thereto.

A variable speed drive is provided to vary the speed of the pump and the rate of delivery of the epoxy resin to the capacitor in accordance with the size of the capacitor 15 and of the recess 18 being filled. Accordingly, the pump rotor shaft 94 has a sprocket 101 connected thereto which in turn is connected through a chain 102 to a sprocket 103 on one section 104-1 of a variable speed drive shaft 104. The shaft sections 104-1 and 104 are connectible to each other through an electrically actuated clutch 105 in response to the energization of the clutch coil 106. The variable speed shaft 104 is driven from a constant speed drive shaft 107 through selectively operable change speed units 109, 109-1, 109-2 and 109-3. The drive shaft 107 is driven through a gear transmission 109 by a motor 110.

Each of the change speed units 109, 109-1, 109-2, 109-3 comprises an electrically actuated clutch 115 for effecting a driving connection between coaxially aligned shaft sections 116-1 and 116-2 in response to energization of the clutch coil 115-1 thereof. The shaft section 116-1 has a sprocket 118 thereon which is connected through a chain 119 to a sprocket 120 on the variable speed drive shaft 104. The shaft section 116-2 is connected through a one-way overrunning clutch 121 to a shaft section 116-3. The latter has a sprocket 123 thereon which is connected through a chain 124 to a sprocket 125 on the main drive shaft 107.

The ratio of the change speed units 109 to 109-3 are such as to impart rotation to the variable speed drive shaft 104 and the pump rotor 93 at various speeds to effect the feeding of the epoxy resin by the pump 53 at rates respectively of 2, 3, 4, and 5 drops per increment of movement of the capacitors 15 in accordance with variations in the thickness of the capacitors.

The main clutch coil 106 is connected to a source of electrical potential 120 (FIG. 14) in series with a pair of normally open contacts 121-1 of a "start" relay 121 and a pair of normally open contacts 122-1 of a "stop" relay 122. The relays 121, 122 are connected to a source of electrical potential 125 in series individually with photocells 126 and 127, respectively. The photocells are mounted on suitable brackets adjacent to the dispensing station 50 (FIG. 11) at one side of the trackway 45 and the path of movement of the capacitor holding fixtures 25 and above and adjacent to the guide rail 59.

A light intercepting vane 130 (FIGS. 11, 12, 14) is mounted for pivotal movement in a horizontal plane below the photocell 126 to selectively intercept the light from a light source 131 (FIG. 14) at a lower level. The vane 130 is supported on a spindle 133 which is journalled in bearing members on a bracket 135 for pivotal movement about a vertical axis. A "start" feeler 137 in the form of a wire is secured at one end to the spindle 133, the other end 137–1 of the feeler being bent laterally and engageable with one side of the upper portions of the capacitors 15 projecting above the capacitor holding fixture 25. A torsion spring 139 (FIG. 11) stresses the spindle 133 for rotation in a clockwise direction as viewed in FIG. 12 to a normal position with the end 137–1 of the feeler in the path of movement of the advancing capacitors 15 and with the vane 130 intercepting the light to the photocell 126.

A similar light intercepting vane 140 and a "stop" feeler 141 are associated with the photocell 127 of the stop relay 122. The vane 140 and the feeler 141 are mounted on a spindle 143 which is supported in the bracket 135 and is stressed by a torsion spring 145 (FIG. 11) for rotation in a clockwise direction as viewed in FIG. 12 to a normal position with the laterally bent end 141–1 of the feeler disposed in the path of movement of the capacitors 15 and with the vane 140 intercepting the light from a light source 146 to the photocell 127.

The clutch coils 115–1 of the change speed units 109 to 109–3 are connected individually to the source of electrical potential 120 in series with normally open relay contacts 150 to 150–3 of relays 151 to 151–3, respectively. The relays 151 to 151–3 are connected individually in series with photocells 152 to 152–3, respectively, to the source of electrical potential 120. The photocells are fixedly supported on a suitable bracket 154 (FIG. 11) on the other side of the trackway 45 above portions 156–1 to 156–4 of a vane 156 for intercepting a beam of light from a light source 157 (FIG. 14). The vane is secured to a spindle 158 that is supported on a fixed bracket 159 for pivotal movement about a vertical axis.

A feeler 160 is secured at one end to the spindle 158 and the other end 160–1 of the feeler is bent laterally and is adapted to engage the opposite side of the portions of the capacitors projecting upwardly above the holding fixture 25 as the latter advances along the trackway 45. A torsion spring 161 (FIG. 11) stresses the spindle 158 in a counterclockwise direction as viewed in FIG. 12, to position the end 160–1 of the feeler in the path of movement of the capacitors 15. Fixed stop members 162 are provided for limiting the extent of angular movement of the several feelers 141, 137, 160, the ends of which feelers are positioned to engage the capacitors 15 in a region in close proximity to the dispensing nozzle 52 (FIG. 13).

The nozzle 52 is made of rubber or other resilient material and has a normal open condition with a restricted passageway therethrough for dispensing the sealing resin in drops or in a fine stream. To insure that drops of the resin do not fall onto the apparatus between successive capacitors a mechanism is provided for compressing and closing the nozzle 52 adjacent to the end thereof on completion of the dispensing of the measured amount of the epoxy resin for the capacitor and the stopping of the pump.

Referring to FIGS. 8–10, a portion of the nozzle 52 adjacent the end thereof rests on a flat end surface of a member 170 which is secured to the vertical frame member 81 and forms a stationary jaw. Cooperating with the stationary jaw to compress the nozzle therebetween is a movable jaw 171 that is made of wire in the form of a crank pin extending laterally from one end of a crank arm 171–1 and from the other of which crank arm extends a shank portion 171–2. The shank portion 171–2 of the movable jaw is secured to an armature 173 of a solenoid 174, is supported for pivotal movement on a relay mounting 175 on the vertical frame 81, and serves to support the armature for pivotal movement therewith.

The solenoid 174 is connected to the source of electrical potential 120 (FIG. 14) in series with a pair of normally closed contacts 122–2 of the stop relay 122. The arrangement is such that during the operation of the pump, the solenoid 174 is de-energized and the movable jaw 171 is open, and in response to the stopping of the rotation of the pump, the solenoid 174 is energized to effect the actuation of the movable jaw 171 to closed position and the compression of the nozzle 52.

*Operation*

Successive capacitor holding fixtures 25 supporting rows of recessed capacitors 15 are placed in the trackway 45 and are advanced by the conveyor chain 47 through the dispensing station 50 to carry successive capacitors beneath the dispensing nozzle 52. A capacitor, as it enters the station, engages the stop feeler 141 (FIGS. 12 and 13) and rocks it and the vane 140 in a counterclockwise direction thereby uncovering portions of the photocell 127 and effecting the energization of the relay 122. This results in the closing of the contacts 122–1, the opening of the contacts 122–2, the de-energization of the solenoid 174, and the unclamping of the nozzle 52.

As the capacitor advances it engages the feeler 160 and rotates it and the vane 156 in a clockwise direction a predetermined distance which varies in accordance with variations in the size and thickness of the capacitors. This in turn uncovers portions of one or more of the photocells 152 to 152–3 and effects the energization thereof and of one or more of the relays 151 to 151–3 associated therewith and the closing of the contacts 150 to 150–3 thereof. This in turn effects the energization of one or more of the clutches 115 associated with the change speed units 109 to 109–3, and the rotation of the variable speed drive shaft 104 at various rates of speed in accordance with the fastest one of the change speed units rendered operative.

Upon further advancement, the capacitor 15 engages the start feeler 137 and rocks it and the vane 130 in a counterclockwise direction to effect the partial uncovering of the photocell 126, the energization of the relay 121, and the closing of the contacts 121–1. With the contacts 122–1 already closed, the closing of the contacts 121–1 completes a circuit to effect the energization of the main clutch coil 106, thereby effecting the connection of the drive to the pump rotor 93. As the rotor 93 revolves, rollers 92 thereon compress successive portions of the pump tube 75 against the backup member 86 and causes the sealing resin in the pump tube in advance of the rollers 92 to be forced along the tube and causes the resin at the nozzle 52 to be dispensed at a predetermined rate into the recess 18 of the capacitor therebeneath. Hence, the pumping mechanism and the variable speed drive therefor operate to dispense the fluid resin at a variable rate in accordance with variations in the thickness or size of the capacitors.

When the "stop" feeler 141 rides off of the advancing capacitor 15, the feeler 141 and the vane 140 are spring actuated in a clockwise direction, thereby covering the photocell 127 and effecting the de-energization of the stop relay 122, the opening of the relay contacts 122–1, and the closing of the contacts 122–2. This in turn results in the energization of the solenoid 174, the actuation of the movable jaw 171, and the compressing of the nozzle 52 to a closed condition.

The cycle of operation is repeated as the following capacitor 15 is advanced into the dispensing station 50 and actuates the feelers 137, 141 and 160.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for dispensing fluid material into recessed articles of different thickness, which comprises:
   fluid dispensing means;
   means for advancing the articles along a path adjacent to said fluid dispensing means;
   means for sensing the thickness of the advancing articles at said fluid dispensing means; and
   means under control of said sensnig means and cooperating with said fluid dispensing means for varying the amount of fluid dispensed thereby in accordance with variations in the thickness of such recessed articles.

2. An apparatus for dispensing fluid material into recessed articles, which comprises:
   means for advancing a recessed article along a predetermined path through a dispensing station;
   conduit means having an outlet disposed at the dispensing station above and adjacent to the path of travel of the article for conducting the fluid material from a supply thereof to an article at the dispensing station;
   pump means for advancing the fluid material along said conduit means;
   a continuously operating drive normally disengaged from said pump means; and
   means including feeler means disposed at the dispensing station in the path of travel of the article and actuated by the article for effecting the engagement of said drive with said pump means to render it operative.

3. An apparatus for dispensing fluid material into recessed articles, which comprises:
   means for advancing recessed articles along a predetermined path;
   conduit means including an outlet disposed above and adjacent to the path of travel of the article for conducting the fluid material from a supply thereof;
   normally unoperative pump means for advancing the fluid material along said conduit means;
   means including a first feeler element disposed in the path of the article and responsive to actuation by the article for rendering said pump means operative; and
   means including a second feeler element disposed in the path of the article and responsive to the disengagement thereof from the article for rendering said pump means unoperative.

4. An apparatus for dispensing fluid material into recessed articles, which comprises:
   means for advancing recessed articles of different thicknesses along a predetermined path;
   conduit means including an outlet disposed above and adjacent to the path of movement of the articles for guiding the fluid material from a supply thereof to an article therebeneath;
   variable speed pump means for advancing the fluid material along said conduit means;
   means including a first feeler element biased to a normal position in the path of the articles adjacent said conduit outlet and responsive to actuation by the article for rendering said pump means operative;
   means including a second feeler element adjacent to said outlet of said conduit and biased into the path of movement of the articles and responsive to the thickness of the article for varying the speed of said pump means; and
   means including a third feeler adjacent said conduit outlet and biased to a normal position in the path of the articles and responsive to the disengagement of the article for rendering said variable speed pump means unoperative.

5. An apparatus for dispensing fluid material into recessed articles, which comprises:
   means for advancing recessed articles of different thicknesses along a predetermined path through a dispensing station;
   conduit means including an outlet disposed at the dispensing station above and adjacent to the path of movement of the articles for guiding the fluid material from a supply thereof to an article beneath said outlet;
   pump means for advancing the fluid material in said conduit means;
   a continuously operating variable speed drive means;
   means responsive to the presence of an article beneath said outlet of said conduit means for connecting said drive means to said pump means; and
   means responsive to variations in the thickness of the articles passing beneath said outlet of said conduit for varying the speed of said drive means.

6. An apparatus for dispensing fluid material into recessed articles, which comprises:
   means for advancing articles of different thicknesses along a predetermined path through a dispensing station;
   means forming a passageway and including an outlet disposed at the dispensing station above and adjacent to the path of movement of the recessed articles for guiding the fluid material from a supply thereof to the recessed articles;
   pump means for advancing the fluid material in said passageway;
   a variable speed drive for said pump means;
   means including a first feeler biased to a normal position in the path of the articles and adjacent to said passageway outlet and responsive to actuation by the article for connecting said drive to said pump means;
   means including a second feeler biased to a normal position in the path of the articles and adjacent to said passageway outlet and responsive to the thickness of the article for varying the speed of said pump means; and
   means including a third feeler biased to a normal position in the path of movement of the articles and adjacent to said passageway outlet and responsive to the disengagement of said third feeler from the article for disconnecting said drive means from said pump means.

7. An apparatus as defined in claim 6 including the provision of closure means for the outlet of said passageway; and
   means responsive to the connecting and the disconnecting of said drive means to said pump means for actuating said closure means to open and to close said outlet, respectively.

8. An apparatus for dispensing fluid material into recessed articles, which comprises:
   means for advancing recessed articles of different thicknesses along a predetermined path from a dispensing station;
   a resilient compressible tube having an outlet end thereof disposed above and adjacent to the path of movement of the articles and an intake end connected to a supply of the fluid material for guiding the fluid material from the supply thereof to an article beneath the outlet end thereof;
   a rotor mounted for rotation about a first axis and having a plurality of rollers supported thereon for rotation about axes parallel to the first axis and equidistant therefrom;

a backup member mounted adjacent to said rotor and having a concave surface for supporting an intermediate portion of said tube in the path of said rollers of said rotor and cooperating therewith to effect the compression of successive portions of said tube in response to rotation of said rotor;

a variable speed drive for said rotor;

means including a first feeler biased to normal position in the path of the articles and adjacent to the outlet end of said tube and responsive to the actuation by the article for connecting said drive to said rotor;

means including a second feeler biased to a normal position in the path of the articles and adjacent to the outlet end of said resilient tube and responsive to the thickness of the articles for varying the speed of said variable speed drive; and means including a third feeler biased to a normal position in the path of movement of the articles and adjacent to said outlet end of said resilient tube and responsive to the disengagement thereof from the article for disconnecting said drive means from said rotor.

9. An apparatus as defined in claim 8 including the provision of a nozzle at the outlet end of said resilient tube, said nozzle being resilient and having a restricted passageway therethrough;

closure means for compressing said nozzle to close the passageway therethrough; and means responsive to the connecting and the disconnecting of said drive means to said rotor for actuating said nozzle compressing means to open and to close, respectively, the passageway therethrough.

10. An apparatus for dispensing fluid material into recessed articles, which comprises:

means for advancing recessed articles of different thicknesses along a predetermined path through a dispensing station;

a container for holding a supply of said fluid material;

a resilient compressible tube having an outlet end thereof disposed above and adjacent to the path of movement of the articles and an intake end connected to said container for guiding the fluid material from the supply to an article beneath the outlet end thereof;

a rotor mounted for rotation about a first axis and having a plurality of rollers supported thereon for rotation about axes parallel to the first axis and equidistant therefrom;

a backup member having a concave surface;

means for releasably mounting said backup member adjacent to said rotor for supporting an intermediate portion of the tube in an arc in the path of said rollers of said rotor and cooperating therewith to effect the compression of successive portions of said tube and the advancement of the fluid material therein in response to rotation of said rotor;

means for releasably supporting said resilient tube and said container for ready replacement thereof;

a variable speed drive for said rotor;

means including feeler means disposed in the path of the articles and adjacent to the outlet end of said tube and responsive to actuation by the article for effecting the connecting and the disconnecting of said drive to and from said rotor; and means including a second feeler disposed in the path of the articles and adjacent to the outlet end of said resilient tube and responsive to the thickness of the articles for varying the speed of said variable speed drive.

11. An apparatus for dispensing fluid material into recessed articles of various thicknesses, which comprises:

a container for holding a supply of the fluid material;

a conduit provided with an outlet for guiding the fluid material from said container to an article therebeneath;

holding means for supporting a plurality of the articles in a row with one side of the articles in a plane and with a recessed end of each of the articles directed upwardly;

means for moving the holding means along a predetermined path parallel to the plane of the articles to advance the articles successively beneath said conduit outlet;

pump means for advancing the fluid material in said conduit;

a variable speed drive means for said pump means;

means including a first feeler means disposed in the path of the articles and adjacent said conduit outlet and responsive to the actuation of said feeler by an article for connecting and disconnecting said drive means to and from said pump means as the article moves into and from a dispensing position beneath said conduit outlet; and means including a second feeler means disposed in the path of movement of the articles adjacent to said conduit outlet and engageable with the other sides of the articles and responsive to variations in the thickness of the articles for varying the speed of said drive means.

12. An apparatus for dispensing fluid material into recessed articles, which comprises:

means for advancing recessed articles of different thickness along a predetermined path;

conduit means including an outlet disposed above and adjacent to the path of movement of the articles for guiding the fluid material from a supply thereof to an article therebeneath;

normally unoperative, variable speed, pump means for advancing the fluid material along said conduit means;

means including a first feeler biased to a normal position in the path of the articles adjacent said conduit outlet and responsive to actuation by the articles, respectively, for rendering said pump means operative; and means including a second feeler disposed adjacent to said outlet of said conduit and in the path of movement of the articles and responsive to actuation thereby, respectively, for varying the speed of said pump means in accordance with variations in the thickness of the articles.

References Cited

UNITED STATES PATENTS

| | | | |
|---|---|---|---|
| 2,740,081 | 3/1956 | McKay et al. | 141—130 X |
| 2,951,618 | 9/1960 | Aldecoa | 141—156 X |
| 3,101,752 | 8/1963 | McK. Martin | 141—141 X |
| 3,280,860 | 10/1966 | Schneider et al. | 141—160 |

FOREIGN PATENTS

| | | |
|---|---|---|
| 657,222 | 2/1963 | Canada. |

LAVERNE D. GEIGER, *Primary Examiner.*

H. S. BELL, *Assistant Examiner.*